United States Patent
Chu et al.

(10) Patent No.: US 7,441,138 B2
(45) Date of Patent: Oct. 21, 2008

(54) SYSTEMS AND METHODS CAPABLE OF CONTROLLING MULTIPLE DATA ACCESS USING BUILT-IN-TIMING GENERATORS

(75) Inventors: Sheng-Yuan Chu, Taipei County (TW); Ching-Wen Lai, Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 233 days.

(21) Appl. No.: 11/465,125

(22) Filed: Aug. 17, 2006

(65) Prior Publication Data

US 2007/0277006 A1 Nov. 29, 2007

(30) Foreign Application Priority Data

May 23, 2006 (TW) .............. 95118268 A

(51) Int. Cl.
*G06F 1/04* (2006.01)
(52) U.S. Cl. ............... 713/400; 713/500; 713/501; 713/503; 713/600; 711/167; 365/233
(58) Field of Classification Search ............ 711/167, 711/710; 713/400, 500, 501, 503, 600; 365/233
See application file for complete search history.

(56) References Cited

U.S. PATENT DOCUMENTS

| | | | |
|---|---|---|---|
| 4,339,808 A | 7/1982 | North | |
| 5,307,320 A * | 4/1994 | Farrer et al. | 365/230.01 |
| 5,701,438 A * | 12/1997 | Bains | 711/211 |
| 5,974,501 A * | 10/1999 | Shaver et al. | 711/105 |
| 6,591,323 B2 | 7/2003 | Yu | |
| 6,842,864 B1 * | 1/2005 | Hampel et al. | 713/401 |
| 7,321,524 B2 * | 1/2008 | Shaeffer et al. | 365/233.1 |
| 2004/0103226 A1 * | 5/2004 | Johnson et al. | 710/52 |

* cited by examiner

*Primary Examiner*—Hong Kim
(74) *Attorney, Agent, or Firm*—Winston Hsu

(57) ABSTRACT

When receiving request commands from different hosts, a data system generates corresponding phase control signals and access signals based on the formats of each request command. Based on the phase control signals, timing signals corresponding to respect request commands and including a plurality of enabling time slots are generated in a way that only one timing signal includes an enabling time slot at a certain point of time. Next, an access control signal is outputted to a storage device during the enabling time slot of a corresponding timing signal. Therefore, the storage device only needs to respond to one request command at a certain point of time, and multiple data access can be effectively controlled in the data system.

8 Claims, 8 Drawing Sheets

US 7,441,138 B2

SYSTEMS AND METHODS CAPABLE OF CONTROLLING MULTIPLE DATA ACCESS USING BUILT-IN-TIMING GENERATORS

CROSS-REFERENCE TO RELATED APPLICATIONS

The following U.S. patent applications disclose subject matter that is related to the subject matter of the present application, and are hereby incorporated herein by reference in their entirety:

U.S. Pat. No. 4,339,808, filed Mar. 4, 1980 and entitled "ASYNCHRONOUS EVENT PRIORITIZING CIRCUIT"; and U.S. Pat. No. 6,591,323, filed Aug. 13, 2002 and entitled "MEMORY CONTROLLER WITH ARBITRATION AMONG SEVERAL STROBE REQUESTS".

BACKGROUND OF THE INVENTION

1. Field of the Invention

The present invention relates to systems and methods capable of controlling multiple data access, and more particularly, to systems and methods capable of controlling multiple data access using a built-in timing generator.

2. Description of the Prior Art

In a fast-developing digital world where data systems are widely used, the accuracy and speed when performing data access, data transmission, data storage and data display have to be improved continuously. One of the most important factors that influence the performance of a data system is data access of the related memory devices. In addition, in a high-speed and multi-functional data system, different tasks are allotted to the memory devices so that corresponding processors and the memory devices can function properly. Common data systems can operate based on a synchronous data access structure or an asynchronous data access structure. In a synchronous data system, a synchronous clock is used for controlling the input/output signals of the memory devices and the internal control signals of the data system. Therefore, the synchronous data system can provide high-speed and accurate data accesses, as well as reduce the time for executing commands and transmitting data. On the other hand, an asynchronous data system does not require a synchronous clock for performing data access. Instead, data is stored or read when corresponding input signals or commands change.

The data systems become more and more complicated in order to provide more functions. Regardless of synchronous or asynchronous structures, a data system is often required to receive multiple commands given by different hosts. When receiving request commands given by different hosts, the data system has to adequately arrange the sequence for executing each request command so that each host can access data successfully. Since an asynchronous data system does not have a synchronous clock signal, an arbitration mechanism is required for prioritizing different request commands. Although a synchronous data system can arrange the sequence for executing each request command based on a synchronous clock signal having a constant period, transmitting the synchronous clock signal consumes large amount of power. In addition, multiple synchronous timing signals, instead of a single synchronous timing signal, are required in a complicated data system. When transmitting signal between the "time zones" of different synchronous timing signals, frequency and phase variations exist and request commands for transmitting signal asynchronously are also required. Therefore, in order to enhance system efficiency, lower power consumption and design data systems of larger scales, asynchronous data transmission without a synchronous timing signal becomes more and more important.

Reference is made to FIG. 1 for a functional diagram illustrating a prioritizing circuit 10 disclosed in U.S. Pat. No. 4,339,808 "ASYNCHRONOUS EVENT PRIORITIZING CIRCUIT". The prioritizing circuit 10 includes a latch 12, a latch control 14, a priority logic 16, and a delay circuit 18. The latch 12 receives asynchronous request commands $REQUEST_1$ and $REQUEST_2$ respectively given by two hosts, and generates corresponding output signals Q1 and Q2 based on a strobe signal S sent from the latch control 14. Based on clear signals $CLEAR_1$, $CLEAR_2$ and the output signals Q1, Q2, the latch control 14 generates the strobe signal S and sends the strobe signal S to the latch 12 and the delay circuit 18. The delay circuit 18 generates a delayed strobe signal S' corresponding to the strobe signal S, and sends the delayed strobe signal S' to the priority logic 16. The priority logic 16 arbitrates priority between the output signals Q1 and Q2 and generates corresponding grant signals $GRANT_1$ and $GRANT_2$ based on the delayed strobe signal S' generated by the delay circuit 18. The prior art prioritizing circuit 10 controls multiple data access using the delay circuit 18 whose characteristics tend to deviate from nominal values when the temperature or the operating voltages vary. Therefore, multiple data access may not be performed accurately and the correctly.

Reference is made to FIG. 2 for a functional diagram illustrating a control circuit 20 for asynchronous events disclosed in U.S. Pat. No. 6,591,323 "MEMORY CONTROLLER WITH ARBITRATION AMONG SEVERAL STROBE REQUESTS". The control circuit 20 includes a pool/queue state machine SM1, transaction processor state machines SM2-SM4, bank state machines SM5-SM8, a command arbitrator 22, a command output flip flop 24, and a dynamic random access memory (DRAM) 26. The prior art control circuit 20 receives asynchronous request commands given by a plurality hosts via the pool/queue state machine SM1 and arbitrates priority between the plurality of request commands based on a state mechanism provided by the transaction processor state machines SM2-SM4 and the bank state machines SM5-SM8. Since a synchronous timing signal is required as the trigger signal in the state mechanism, the prior art control circuit 20 cannot be applied in asynchronous data systems.

SUMMARY OF THE INVENTION

The present invention provides a data system capable of controlling multiple data access comprising a storage device for receiving a control signal and an address signal and for accessing data stored at an address corresponding to the address signal; a multiple access control device for receiving a plurality of request commands given by a plurality of hosts when attempting to access the storage device, and thereby generating corresponding phase control signals and access signals based on the request commands; a timing signal generating device for receiving the phase control signals generated by the multiple access control device and thereby generating a plurality of timing signals each related to a corresponding request command and including a plurality of enabling time slots based on a phase reference signal and a corresponding phase control signal, wherein only a timing signal among the plurality of timing signals includes an enabling time slot at a certain point of time; an access control device for receiving the access signals and the timing signals respectively generated by the multiple access control device and the timing signal generating device, and outputting corresponding control signals to the storage device during the enabling time slots of corresponding timing signals; and an address control device for receiving the access signals and the timing signals respectively generated by the multiple access control device and the timing signal generating device, and generating a plurality of address signals each related to a corresponding access signal.

The present invention also provides a method for controlling multiple data access comprising receiving a plurality of request commands, generating phase control signals and access signals corresponding to each request command, generating a plurality of timing signals each related to a corresponding request command and including a plurality of enabling time slots based on a corresponding phase control signal, wherein only a timing signal among the plurality of timing signals includes an enabling time slot at a certain point of time, outputting corresponding control signals during the enabling time slots of corresponding timing signals, and generating a plurality of address signals each related to a corresponding access signal, and accessing data stored in a storage device based on the control signals and the corresponding address signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
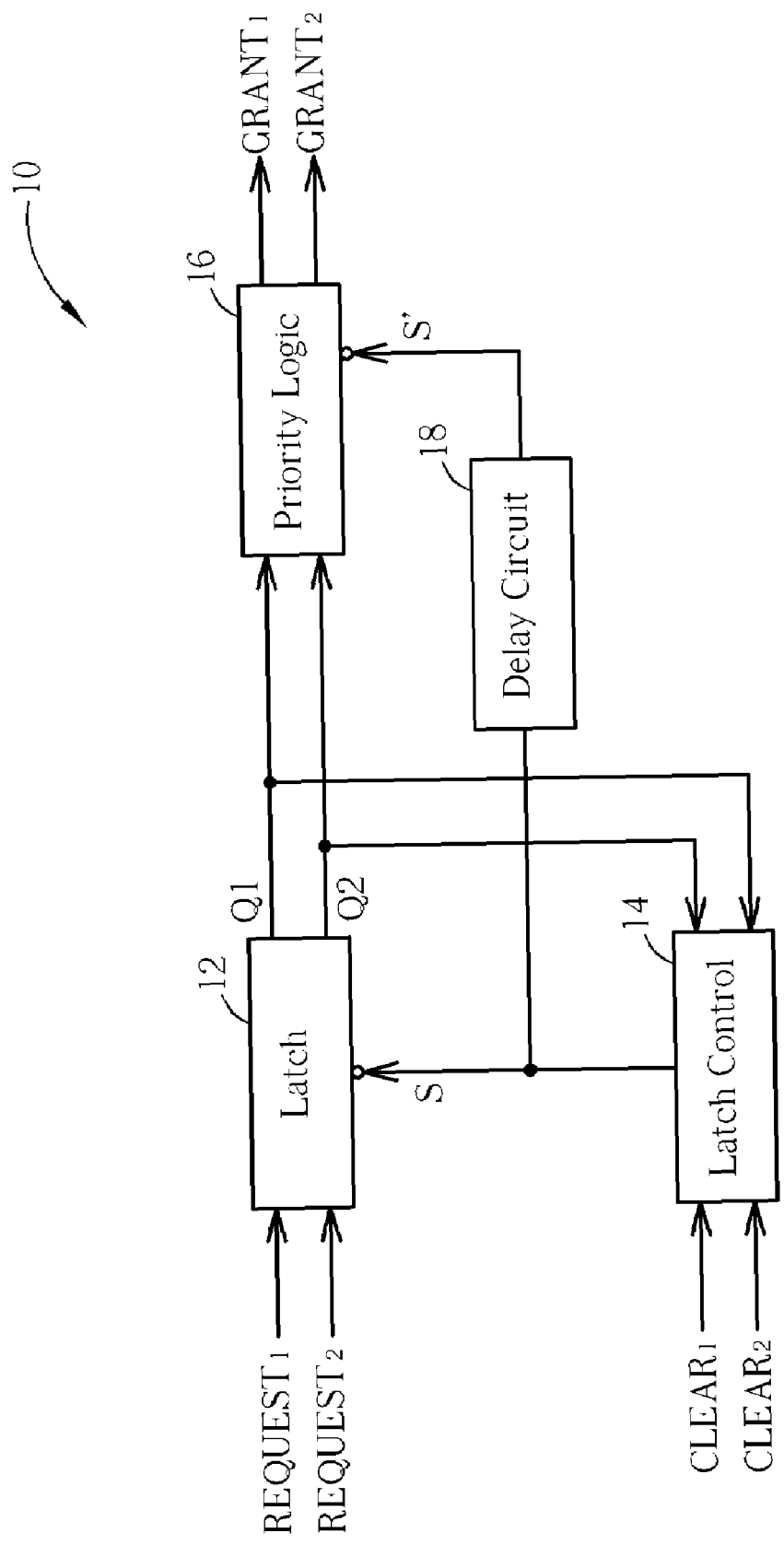
FIG. 1 is a functional diagram of a prior art prioritizing circuit.
Figure 2:
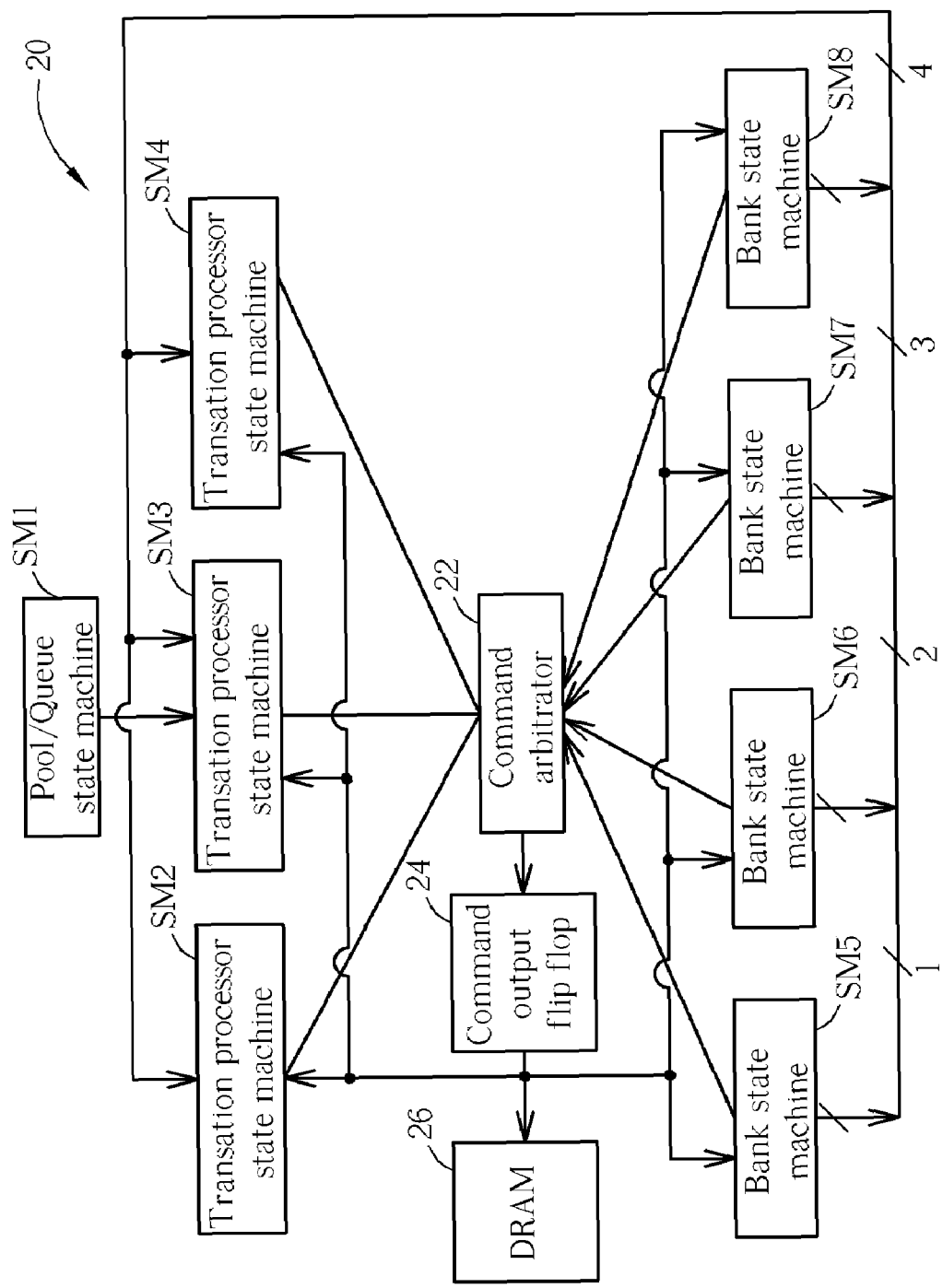
FIG. 2 is a functional diagram of a prior control circuit for asynchronous events.
Figure 3:
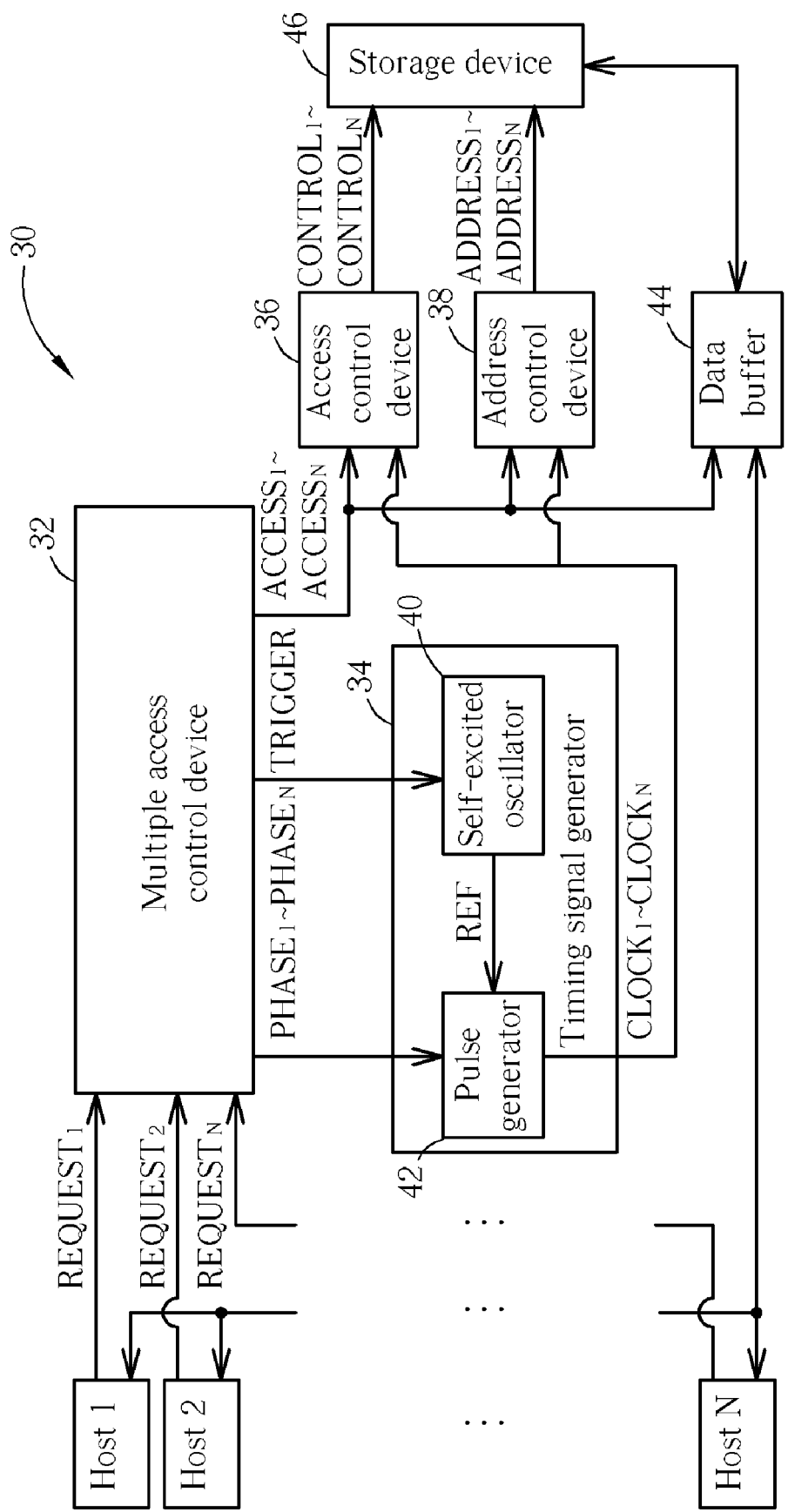
FIG. 3 is a functional diagram of a data system capable of controlling multiple data access according to the present invention.

Reference is made to FIG. 3 for a functional diagram illustrating a data system 30 capable of controlling multiple data access according to the present invention. The data system 30 includes a multiple access control device 32, a timing signal generator 34, an access control device 36, an address control device 38, a data buffer 44, and a storage device 46. The data system 30 can receive commands given by a plurality of external systems, which are represented by a plurality of hosts designated as host 1 trough host N in FIG. 3. The request commands given by host 1-host N when attempting to access data stored in the storage device 46 are respectively represented by $REQUEST_1$-$REQUEST_N$. The data system 30 receives the request commands $REQUEST_1$-$REQUEST_N$ via the multiple access control device 32, which then generates corresponding phase control signals $PHASE_1$-$PHASE_N$, access signals $ACCESS_1$-$ACCESS_N$, and a trigger signal TRIGGER.

The timing signal generator 34 is coupled to the multiple access control device 32 and includes a self-excited oscillator 40 and a pulse generator 42. After receiving the trigger signal TRIGGER, the self-excited oscillator 40 generates a phase reference signal REF. Based on the phase reference signal REF and the phase control signals $PHASE_1$-$PHASE_N$, the pulse generator 42 generates timing signals $CLOCK_1$-$CLOCK_N$ respectively corresponding to the request commands $REQUEST_1$-$REQUEST_N$. Each of the timing signals $CLOCK_1$-$CLOCK_N$ includes a plurality of enabling time slots, and only one of the timing signals $CLOCK_1$-$CLOCK_N$ includes an enabling time slot at a certain point of time. The relationship between the timing signals $CLOCK_1$-$CLOCK_N$ will be described in more detail in the following paragraphs.

The access control device 36, coupled to the multiple access control device 32 and the timing signal generator 34, can receive access signals $ACCESS_1$-$ACCESS_N$ related to the request commands $REQUEST_1$-$REQUEST_N$, and outputs corresponding control signals $CONTRL_1$-$CONTROL_N$ respectively during the enabling time slots of the timing signals $CLOCK_1$-$CLOCK_N$ to the storage device 46. The address control device 38, also coupled to the multiple access control device 32 and the timing signal generator 34, can receive access signals $ACCESS_1$-$ACCESS_N$ related to the control signals $CONTRL_1$-$CONTROL_N$, and outputs address signals $ADDRESS_1$-$ADDRESS_N$ respectively related to the control signals $CONTRL_1$-$CONTROL_N$ to the storage device 46. The address signals $ADDRESS_1$-$ADDRESS_N$ represent related addresses at which data is to be accessed based on the request commands $REQUEST_1$-$REQUEST_N$, respectively.

The storage device 46 can include any type of memory, and a dynamic random access memory (DRAM) is used for illustrating the present invention. After receiving a control signal and its corresponding address signal, the storage device 46 accesses data stored at a corresponding address indicated by the address signal. For example, when the storage device 46 receives a control signal $CONTROL_1$ representing a request command for data read together with its corresponding address signal $ADDRESS_1$, the storage device 46 outputs data stored at an address indicated by the address signal $ADDRESS_1$ to the host 1 via the data buffer 44. When the storage device 46 receives a control signal $CONTROL_1$ representing a request command for data write together with its corresponding address signal $ADDRESS_1$, the storage device 46 stores data into an address indicated by the address signal $ADDRESS_1$ via the data buffer 44.

The request commands given by the hosts have to match a predetermined protocol, so that the data system 30 can properly identify the request commands and execute corresponding steps. Based on the formats of the request commands $REQUEST_1$-$REQUEST_N$ given by the host 1-host N, the data system 30 of the present invention can generate corresponding phase control signals $PHASE_1$-$PHASE_N$ that respectively include information of each parameter in the request commands $REQUEST_1$-$REQUEST_N$. Therefore, the pulse generator 42 of the timing signal generator 34 can adjust the phase reference signal REF based on the phase control signals $PHASE_1$-$PHASE_N$ in order to generate the timing signals $CLOCK_1$-$CLOCK_N$ corresponding to the request commands $REQUEST_1$-$REQUEST_N$, respectively.

Figure 4:
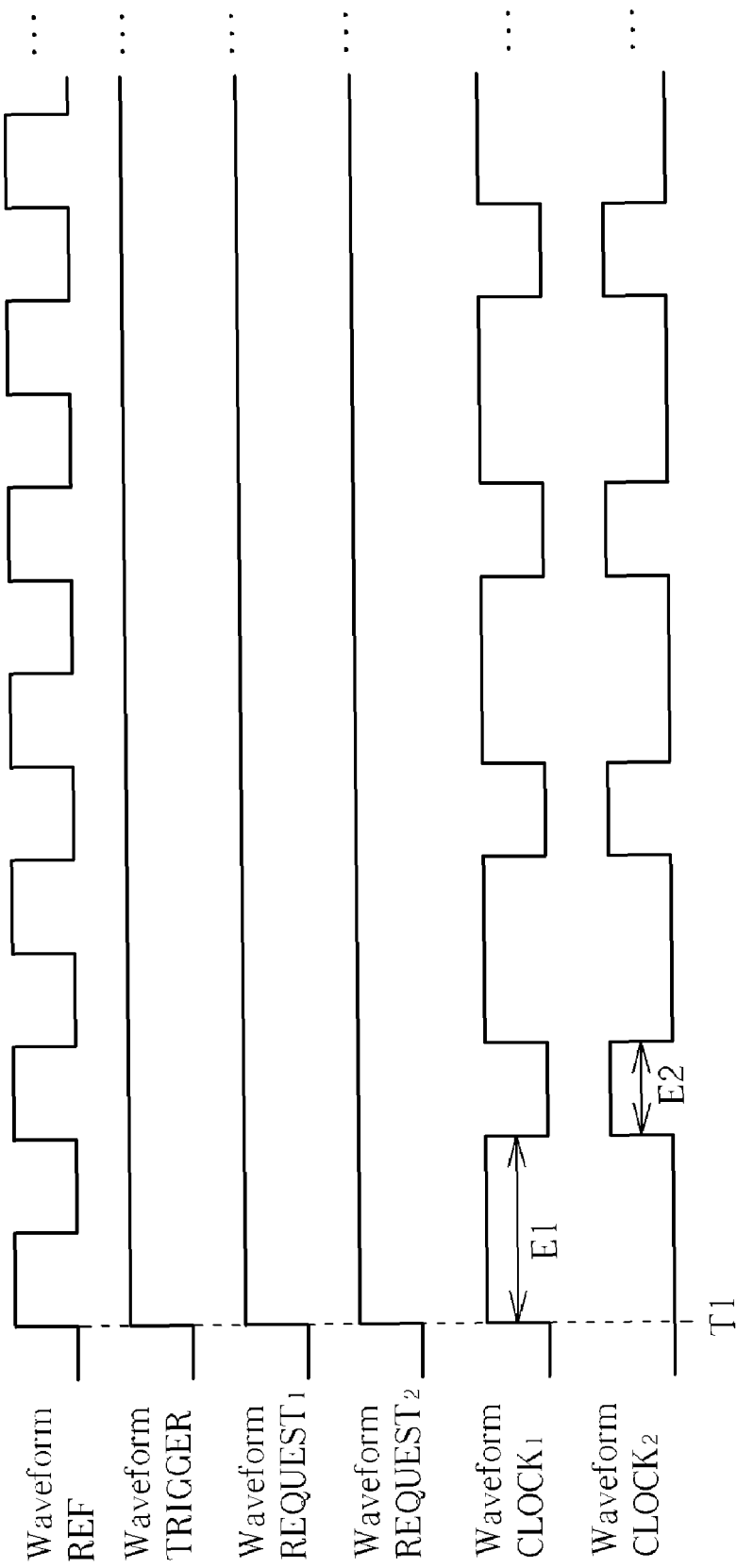
FIG. 4 is a signal diagram illustrating a method for controlling multiple data access in a data system according to a first embodiment of the present invention.

Reference is made to FIG. 4 for a signal diagram illustrating a method for controlling multiple data access in the data system 30 according to a first embodiment of the present invention. If the data system 30 simultaneously receives the request command $REQUEST_1$ from the host 1 and the request command $REQUEST_2$ from the host 2, the phase reference signal REF, the trigger signal TRIGGER, the timing signals $CLOCK_1$ and $CLOCK_2$, and the received request commands $REQUEST_1$ and $REQUEST_2$ are illustrated by waveforms of respective namesakes in FIG. 4. At T1 the trigger signal TRIGGER activates the self-excited oscillator 40, which then generates the phase reference signal REF. Based on the phase control signal $PHASE_1$ related to the request command $REQUEST_1$, the phase control signal $PHASE_2$ related to the request command $REQUEST_2$, and the phase reference signal REF, the pulse generator 42 generates the timing signal $CLOCK_1$ and the timing signal $CLOCK_2$ each including a plurality of enabling time slots. The enabling time slots of the timing signals $CLOCK_1$ and $CLOCK_2$ can be the periods in which respective waveforms have a high level, and are represented by E1 and E2 in FIG. 4, respectively. The lengths of the enabling time slots E1 and E2 depend on the formats of the request commands $REQUEST_1$ and $REQUEST_2$, and only one timing signal includes an enabling time slot at a certain point of time. As a result, when the access control device 36 outputs control signals $CONTRL_1$ and $CONTROL_2$ respectively during the enabling time slots of the timing signals $CLOCK_1$ and $CLOCK_2$ to the storage device 46, the storage device 46 only responds to the host 1 or the host 2 at a certain point of time. The present invention can thus control multiple data access using the timing signals including a plurality of enabling time slots.

Figure 5:
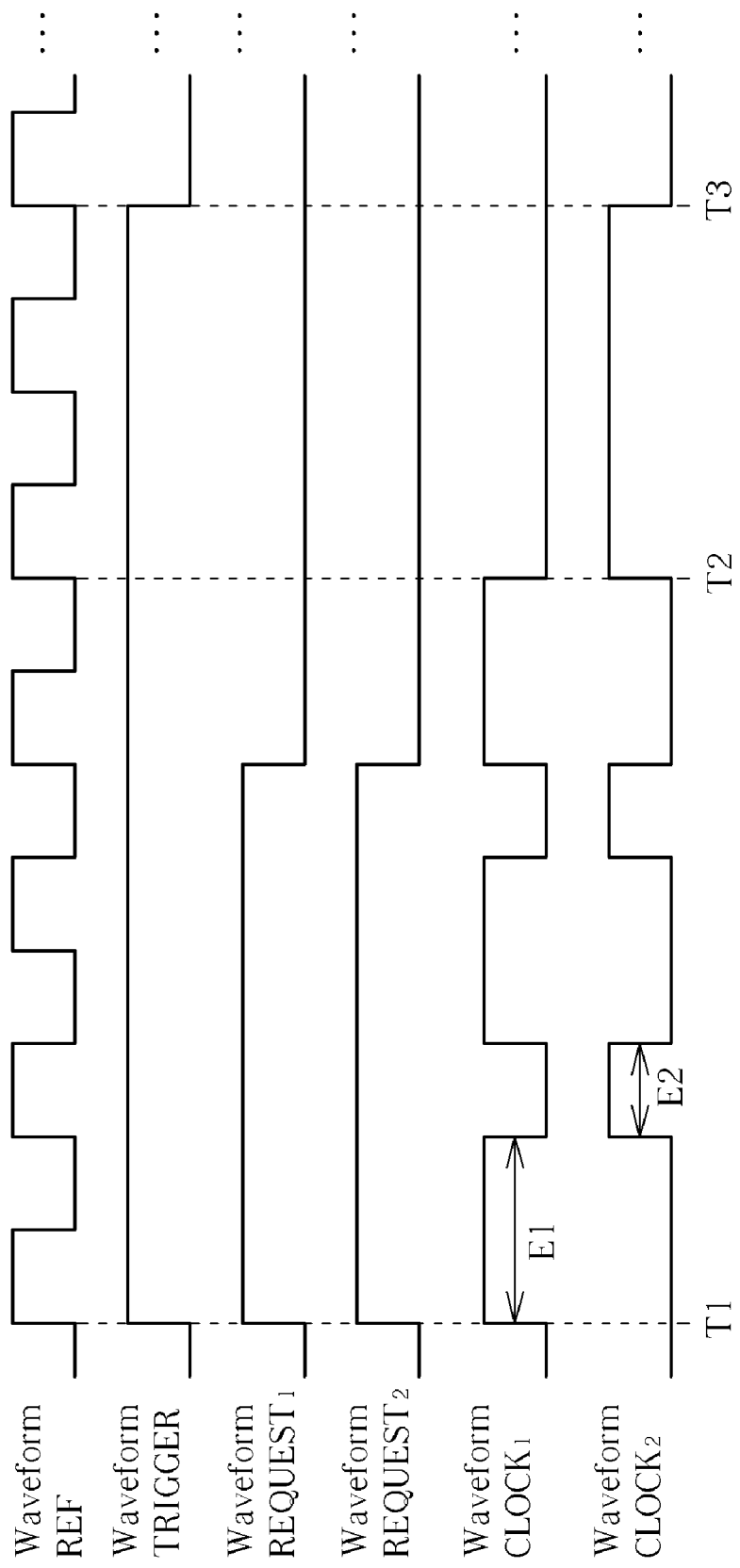
FIG. 5 is a signal diagram illustrating a method for controlling multiple data access in a data system according to a second embodiment of the present invention.

Reference is made to FIG. 5 for a signal diagram illustrating a method for controlling multiple data access in the data system 30 according to a second embodiment of the present invention. If the data system 30 simultaneously receives the request command $REQUEST_1$ from the host 1 and the request command $REQUEST_2$ from the host 2, the phase reference signal REF, the trigger signal TRIGGER, the timing signals $CLOCK_1$ and $CLOCK_2$, and the received request commands $REQUEST_1$ and $REQUEST_2$ are also illustrated by waveforms of respective namesakes in FIG. 5. In the second embodiment of the present invention, the data system 30 has already completed the request command $REQUEST_1$ given by the host 1 at T2 and does not receive any request command given by other hosts. Therefore, the timing signal $CLOCK_2$ includes an enabling time slot that starts at T2 and finishes at T3 when the data system 30 has completed the request command $REQUEST_2$ given by the host 2.

Figure 6:
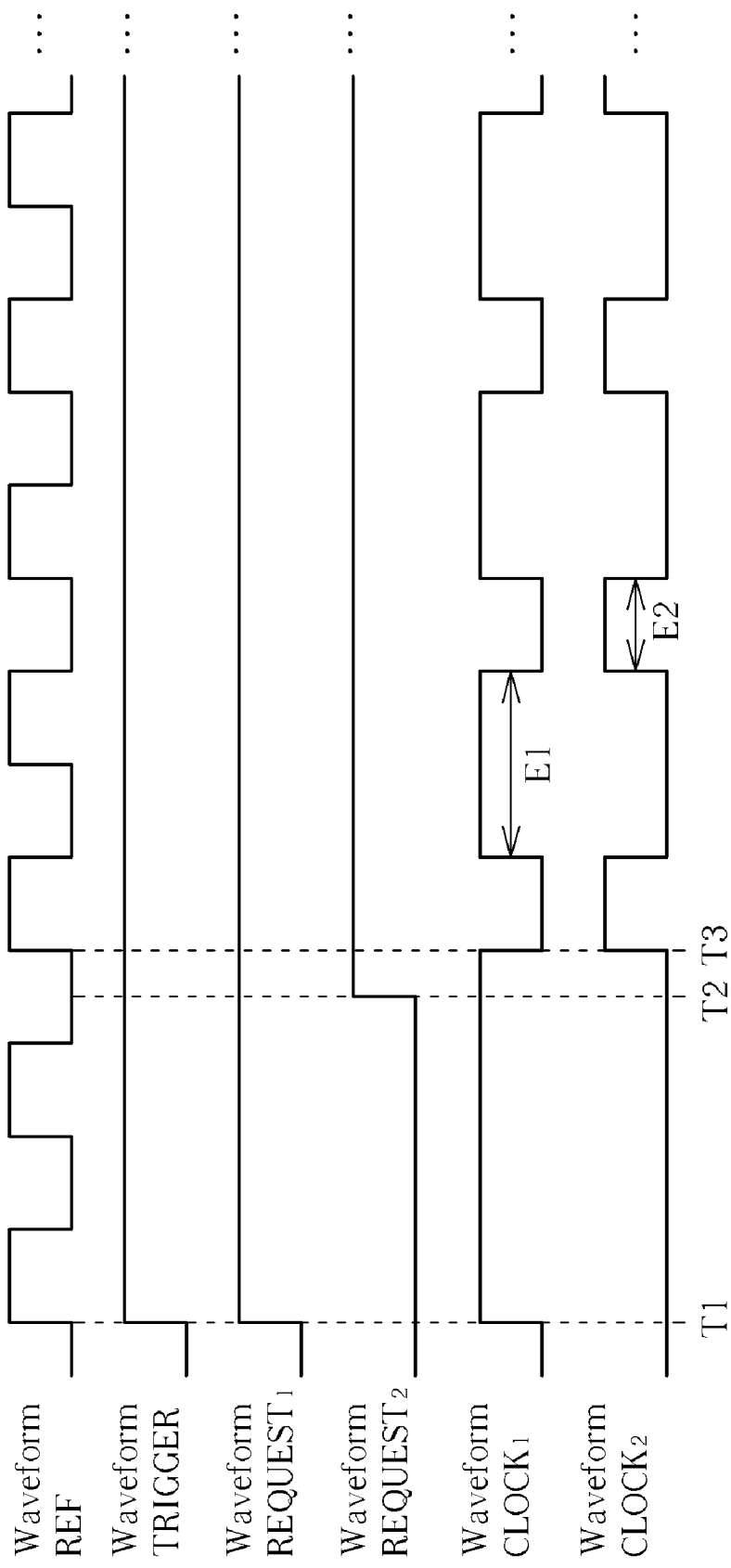
FIG. 6 is a signal diagram illustrating a method for controlling multiple data access in a data system according to a third embodiment of the present invention.
Figure 7:
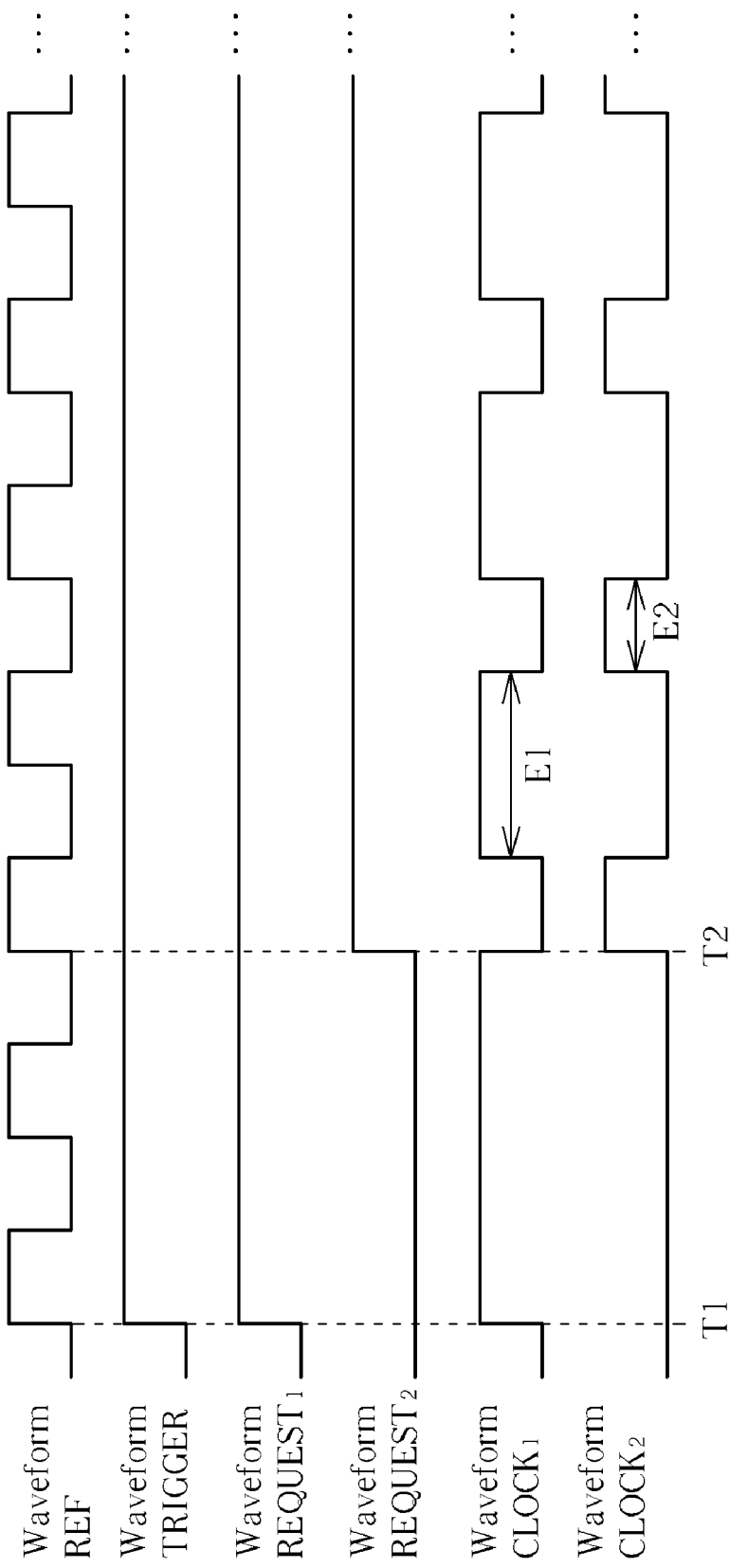
FIG. 7 is a signal diagram illustrating a method for controlling multiple data access in a data system according to a fourth embodiment of the present invention.

Reference is made to FIGS. 6 and 7 for signal diagrams illustrating methods for controlling multiple data access in the data system 30 according to a third and fourth embodiments of the present invention. If the data system 30 receives the request command $REQUEST_2$ from the host 2 while executing the request command $REQUEST_1$ given by the host 1, the phase reference signal REF, the trigger signal TRIGGER, the timing signals $CLOCK_1$ and $CLOCK_2$, and the received request commands $REQUEST_1$ and $REQUEST_2$ are also illustrated by waveforms of respective namesakes in FIGS. 6 and 7. In the third embodiment of the present invention, T2 does not correspond to an integral multiple of the period of the phase reference signal REF, which means the data system 30 cannot terminate the execution of the request command $REQUEST_1$ immediately. Therefore, when receiving the request command $REQUEST_2$ from the host 2 at T2, the data system 30 continues to execute the request command $REQUEST_1$ given by the host 1 until T3, which corresponds to a next integral multiple of the period of the phase reference signal REF. Then the timing signals $CLOCK_1$ and $CLOCK_2$ including the enabling time slots E1 and E2 are used for controlling multiple data access. Similarly, in the fourth embodiment of the present invention, T2 corresponds to an integral multiple of the period of the phase reference signal REF, which means the data system 30 can terminate the execution of the request command $REQUEST_1$ immediately. Therefore, when receiving the request command $REQUEST_2$ from the host 2 at T2, the data system 30 can immediately control multiple data access using the timing signals $CLOCK_1$ and $CLOCK_2$ including the enabling time slots E1 and E2.

Figure 8:
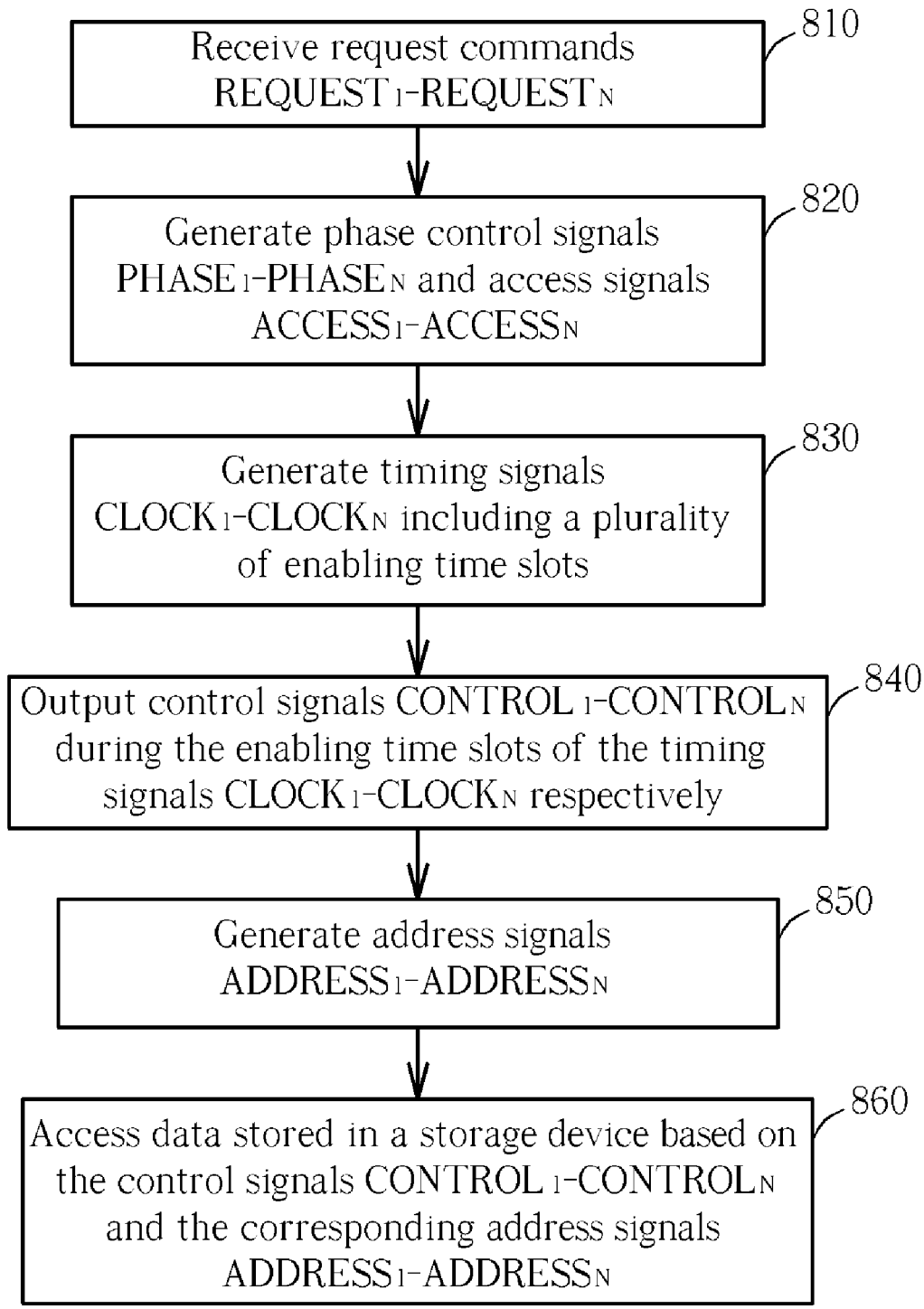
FIG. 8 is a flowchart illustrating a method for controlling multiple data access in a data system according to the present invention.

Reference is made to FIG. 8 for a flowchart illustrating steps for multiple data access in the data system 30 according to the present invention. The flowchart in FIG. 8 includes the following steps:

Step 810: receive request commands $REQUEST_1$-$REQUEST_N$;

Step 820: generate phase control signals $PHASE_1$-$PHASE_N$ and access signals $ACCESS_1$-$ACCESS_N$ respectively corresponding to the request commands $REQUEST_1$-$REQUEST_N$;

Step 830: generate timing signals $CLOCK_1$-$CLOCK_N$ including a plurality of enabling time slots based on the request commands $REQUEST_1$-$REQUEST_N$ respectively;

Step 840: output control signals $CONTROL_1$-$CONTROL_N$ during the enabling time slots of the timing signals $CLOCK_1$-$CLOCK_N$ respectively;

Step 850: generate address signals $ADDRESS_1$-$ADDRESS_N$ respectively corresponding to the request commands $REQUEST_1$-$REQUEST_N$ based on the access signals $ACCESS_1$-$ACCESS_N$ respectively; and Step 860: access data stored in a storage device based on the control signals $CONTROL_1$-$CONTROL_N$ and the corresponding address signals $ADDRESS_1$-$ADDRESS_N$.

In the data system of the present invention, the self-excited oscillator 40 of the timing signal generator 34 is not activated if no request command is given, thereby reducing power consumption. When receiving request commands given by different hosts, the multiple access control device 32 activates the self-excited oscillator 40 and generates corresponding phase control signals based on the formats of the request commands. The pulse generator 42 can thus adjust a phase reference signal generated by the self-excited oscillator 40 based on each phase control signal, and generates timing signals having a plurality of enabling timing slots. Only one timing signal includes an enabling time slot at a certain point of time. As a result, the storage device 46 only responds to a request command given by a host at a certain point of time. The present invention can thus effectively control multiple data access using the timing signals including a plurality of enabling time slots.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data system capable of controlling multiple data access comprising:

a storage device for receiving a control signal and an address signal and for accessing data stored at an address corresponding to the address signal;

a multiple access control device for receiving a plurality of request commands given by a plurality of hosts when attempting to access the storage device, and thereby generating corresponding phase control signals and access signals based on the request commands;

a timing signal generating device for receiving the phase control signals generated by the multiple access control device and thereby generating a plurality of timing signals each related to a corresponding request command and including a plurality of enabling time slots based on a phase reference signal and a corresponding phase control signal, wherein only a timing signal among the plurality of timing signals includes an enabling time slot at a certain point of time;

an access control device for receiving the access signals and the timing signals respectively generated by the multiple access control device and the timing signal generating device, and outputting corresponding control signals to the storage device during the enabling time slots of corresponding timing signals; and an address control device for receiving the access signals and the timing signals respectively generated by the multiple access control device and the timing signal generating device, and generating a plurality of address signals each related to a corresponding access signal.

2. The data system of claim 1 further comprising a data buffering device for storing the access signals outputted by the multiple access control device, data to be stored in the storage device and data outputted by the storage device.

3. The data system of claim 1 wherein the timing signal generating device comprises:

a self-excited oscillating device for generating the phase reference signal when receiving a trigger signal generated by the multiple access control device; and a pulse generating device for generating the plurality of timing signals.

4. The data system of claim 1 wherein the storage device includes a dynamic random access memory (DRAM).

5. A method for controlling multiple data access comprising the following steps:

(a) receiving a plurality of request commands;

(b) generating phase control signals and access signals corresponding to each request command;

(c) generating a plurality of timing signals each related to a corresponding request command and including a plurality of enabling time slots based on a corresponding phase control signal, wherein only a timing signal among the plurality of timing signals includes an enabling time slot at a certain point of time;

(d) outputting corresponding control signals during the enabling time slots of corresponding timing signals;

(e) generating a plurality of address signals each related to a corresponding access signal; and (f) accessing data stored in a storage device based on the control signals and the corresponding address signals.

6. The method of claim 5 wherein step (c) includes generating a plurality of timing signals each related to a corresponding request command and including a plurality of enabling time slots based on a phase reference signal and a corresponding phase control signal.

7. The method of claim 6, wherein step (c) further comprises before generating the plurality of timing signals, generating the phase reference signal.

8. The method of claim 7 further comprising:

generating a trigger signal when receiving the request commands; and generating the phase reference signal when receiving the trigger signal.

* * * * *